June 29, 1943.    J. M. FOSTER    2,322,841
VEHICLE FRAME
Filed July 8, 1940    4 Sheets-Sheet 1
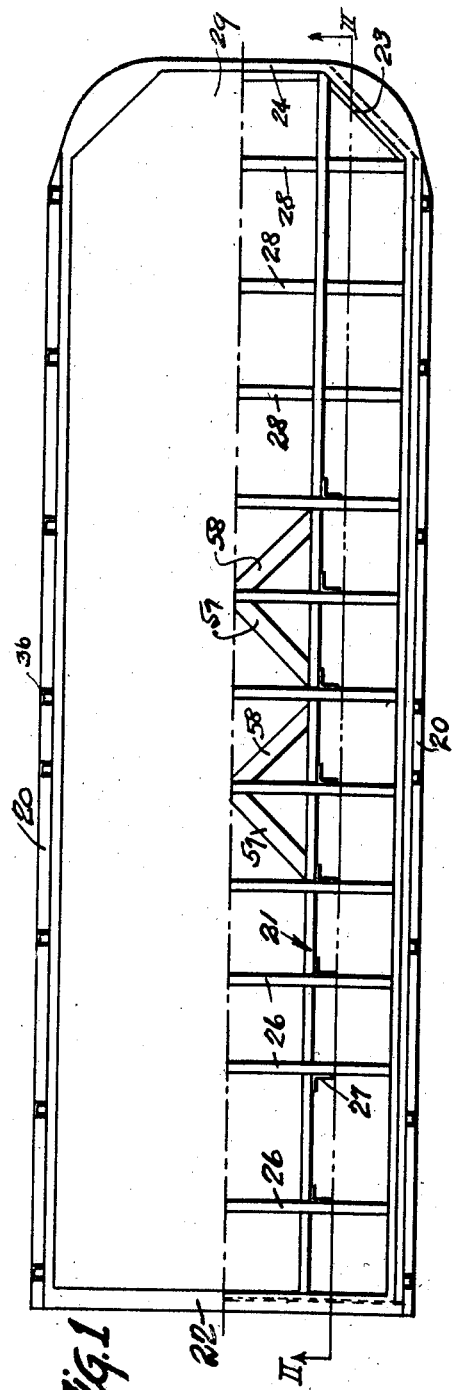
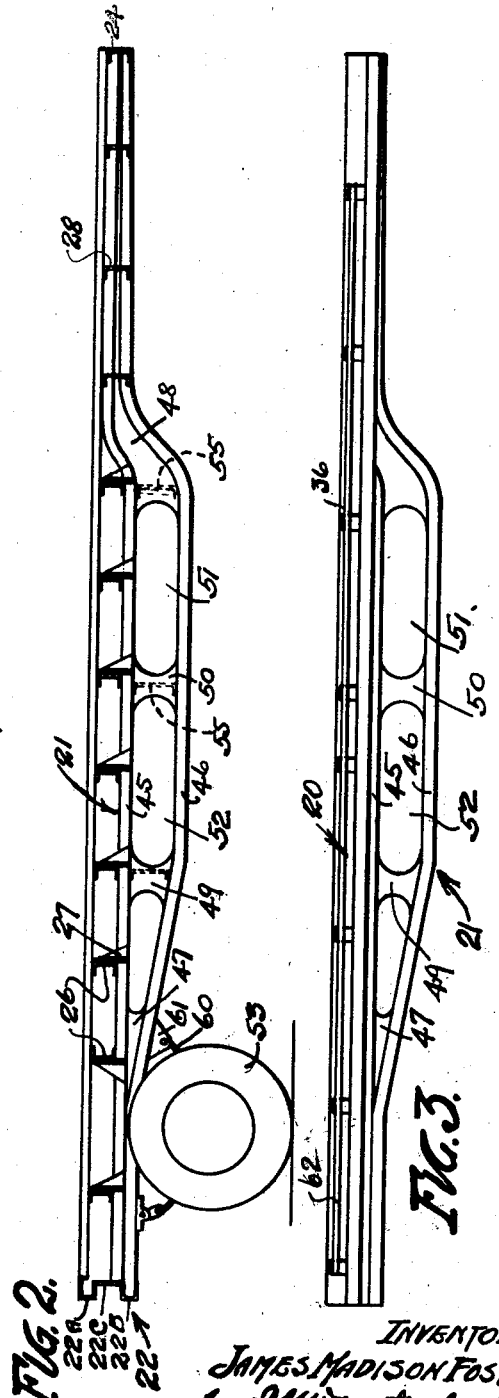
INVENTOR
James Madison Foster

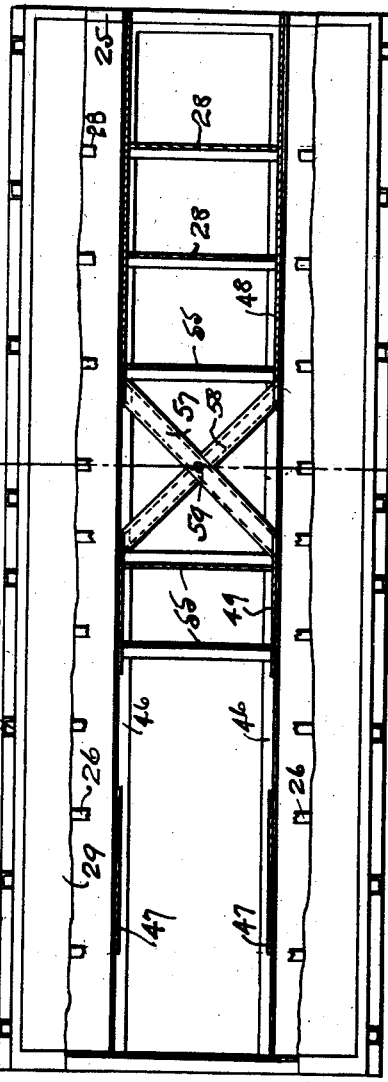

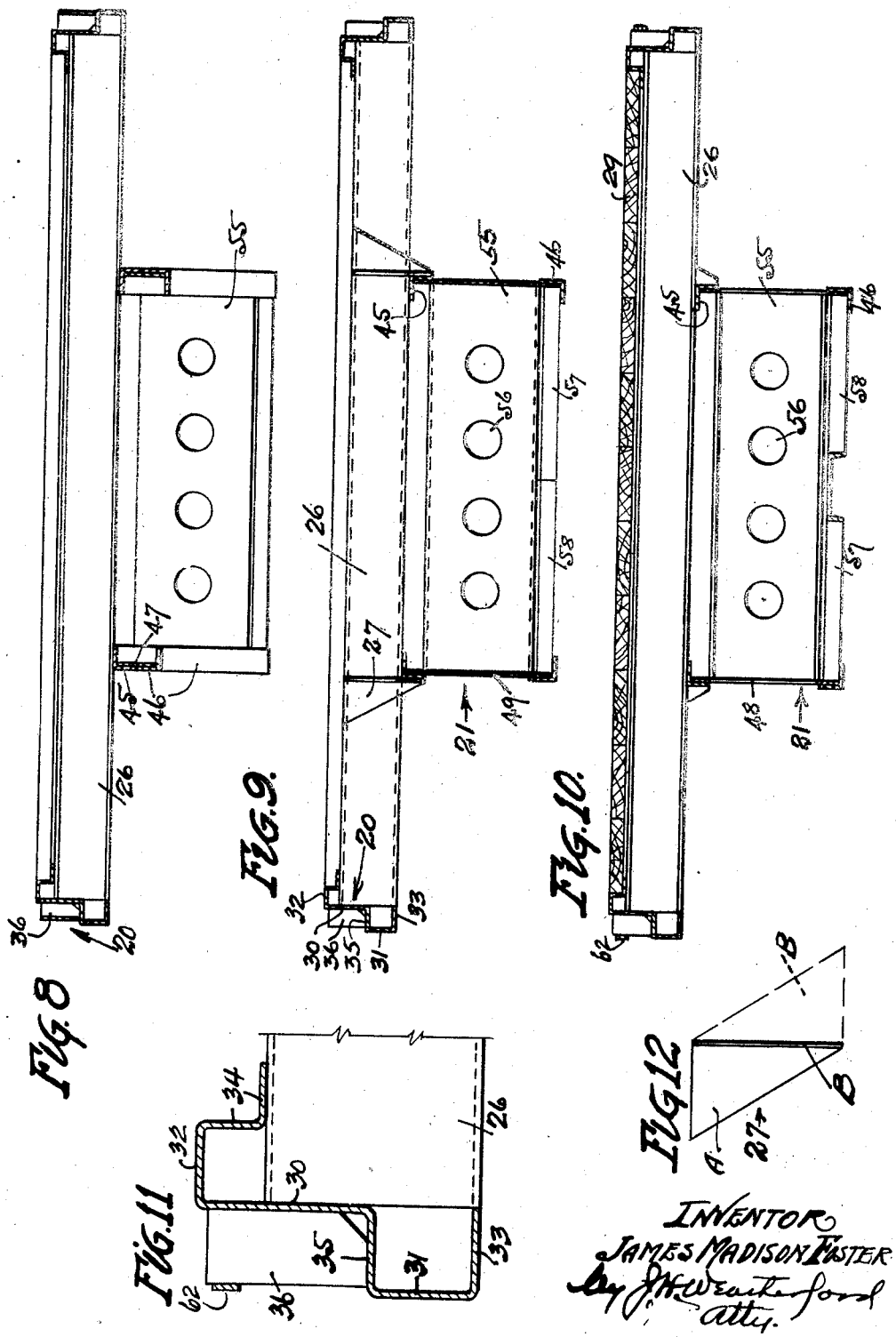

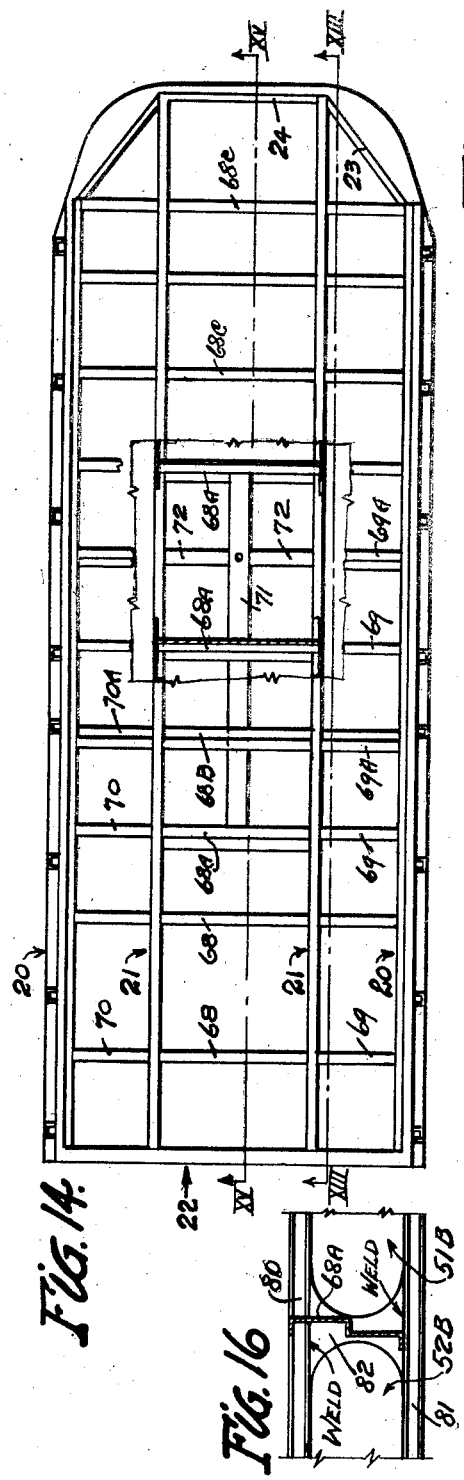

Patented June 29, 1943

2,322,841

UNITED STATES PATENT OFFICE 2,322,841

VEHICLE FRAME

James Madison Foster, Memphis, Tenn.

Application July 8, 1940, Serial No. 344,335

9 Claims. (Cl. 280—106)

This invention relates to the floor frame of a vehicle body, and particularly to frames for auto-trucks or trailers.

In the embodiments shown a trailer frame has been delineated.

In the construction of vehicle bodies it is customary to provide longitudinal truss members having sufficient depth immediate their length to support the load to be carried by the floor. As the length of bodies have increased trussing has been resorted to in order to increase the depth at the mid point. With the advent of road vehicles having pneumatic tires provision has been made for carrying spare tires. This provision is ordinarily made by using auxiliary supporting members which depend from the frame and in some cases bring the supported tire much too near the road surface. This has to a certain extent been obviated where a single deep truss member along the longitudinal center portion of the body is used and the side frames are shallower so that the tires underlie these side frames only and extend against the center truss member, but where two truss members adjacent the centers are used these usually cannot be so closely spaced as to make the extra depth available. In either event also extra heavy construction of floor beams is necessary in order to transfer the load along the outer edges of the body to the center trusses.

Truss frame members usually also are of heavy solid web construction or where lightness has been given due consideration, skeleton tension members, usually rods, are used, this inherently inviting destruction by accident.

In platform bodies having removable sides supported by stakes, it is customary to provide pockets for the stakes which pockets are attached to the sides of the frames and form projections inviting destruction. To obviate this in some cases the pockets have been put on the inner side of the web, but in such cases the top member of the beam is cut through and seriously weakened.

At the rear end of the body tail lights, stop lights, reflectors, and sometimes other accessories are placed. Little attention has been paid in general towards providing a panel or protection of any kind for the structures with the result that they are expensive to install and are very often destroyed by apparently normal use of the truck.

The objects of the invention are:

To provide a vehicle frame of integral construction which is of light weight for the load to be carried, which makes provision for storage room for spare tires, and which provides a maximum protection for the structural and accessory units employed.

To provide a vehicle frame of light weight and sturdy construction with structural means for housing an auxiliary tire or tires.

To provide in a vehicle frame a side rail affording strength and protection to auxiliary parts thereof.

To provide in a vehicle frame a rear end member adapted to house and protect auxiliary structures, particularly such as signal lights.

To provide a vehicle frame truss member adapted by its construction to provide structurally for housing spare tires and adapted to afford protection therefor.

The means by which the foregoing and other objects are accomplished and the method of their accomplishment will readily be understood from the following specification upon reference to the accompanying drawings, in which:

Fig. 1 is a plan view of the vehicle body.

Fig. 2 is a sectional elevation taken as on the line II—II of Fig. 1, showing a drop top truss built up largely from rolled structural shapes.

Fig. 3 is a corresponding side elevation.

Fig. 4 is a plan view of a shorter truck frame with the center portion in section on the line IV—IV of Fig. 5.

Fig. 5 is the side elevation of the body shown in plan in Fig. 4.

Fig. 6 is an enlarged elevation of the rear end of the frame.

Fig. 7 is an enlarged section of the rear bolster taken on the line VII—VII of Fig. 6.

Fig. 8 is a sectional elevation taken on the line VIII—VIII of Fig. 5.

Fig. 9 is a sectional elevation taken on the line IX—IX of Fig. 5.

Fig. 10 is a section taken on the line X—X of Figs. 4 and 5.

Fig. 11 is an enlarged sectional elevation as on the same line, of the side rail; and Fig. 12 is a sketch of a gusset plate.

Fig. 13 is a sectional elevation taken as on the line XIII—XIII of Fig. 14 showing a straight top truss built up from flanged sheets with metal flaps.

Fig. 14 is a plan view of a vehicle frame employing the truss, a portion of the top of the frame being cut away as on the line XIV—XIV of Fig. 13.

Fig. 15 is an enlarged sectional elevation, taken as on the line XV—XV of Fig. 14, of the rear end portion and goose neck portion of the truss.

Fig. 16 is a complementary view of the central portion of the truss.

Fig. 17 is a slightly modified view of the rear end portion of the truss showing a wood floor construction; and Fig. 18 is a similar fragmentary sectional elevation showing a tool box construction.

Referring now to the drawings in which the various parts are indicated by numerals in all the views:

The frame includes side rails 20 and inner trusses 21, these trusses and rails being integrally connected at their rear ends as by welding to a rear bolster 22 and at their forward ends by structural frame members 23, 24, if the frame is to have a rounded front end, or by a single transverse member 25, if the front end of the frame is to be substantially square as shown in Fig. 4. The trusses 21 at their front ends are reduced in depth and additionally preferably arch upward to provide a goose-neck and permit turning of the front wheels (not shown) therebeneath. Floor beams 26 extend from side rail 20 to side rail 20 and rest on top of the trusses 21, throughout the major portion of the length of the body, these floor beams preferably being of channel iron and being butted at their ends against the side rails and secured thereto as by welding, and secured to the tops of the trusses as by welded gusset plates 27, the gusset plates each being preferably formed by cutting a blank in the form of an oblique sided parallelogram, as shown by the full and dotted lines in Fig. 12, and bending this blank along the shorter diagonal of the parallelogram to form an angle having legs A and B, each of triangular form, the wider portion of one leg, as the leg A, being laid flat against the back of the beam 26 and welded thereto and the broader portion of the leg B against a side of the upper angle of the truss 21 and welded thereto. At the forward end of the body, the floor beams 28 may lie between the trusses, and between the side rails and trusses, the beams 26 and 28 supporting a floor 29, here shown of wood.

The side rails 20 are formed by rolling, bending or pressing, as from sheet metal, a channel shaped member having a vertically disposed and stepped web 30, 31, and upper and lower flanges 32, 33, the upper flange extending inwardly and having an L shaped edge portion 34 extending downwardly and continuing inwardly to form a shelf, the lower portion 31 of the web being outwardly off-set from the upper portion 30 intermediate the depth of the rail, the intermediate portion 35 forming a shelf, and the lower flange extending inwardly from the bottom of the lower portion. The rail has a plurality of open top stake pockets 36 spaced at intervals along its length, these pockets overlying the web shelf 35 and being integrally secured as by welding to the upper web portion 30 above the shelf. Preferably the outer sides of the pockets do not extend beyond the lower web portion 31, whereby such lower web portion will form a continuous rub rail protecting the pockets.

The rear bolster 22 comprises upper and lower U-shaped rail portions 22—A, 22—B, preferably of identical cross section, these rail portions being disposed with their leg portions facing forward and the inner legs of the rails being connected by a flat plate or panel portion 22—C adapted to carry the usual tail light 40, stop light 41 and reflectors 42 and the wiring 43 for the stop and tail lights, on the rear end of the vehicle. The legs of the U are of such length that a pocket is formed of sufficient depth to house and protect the stop and tail lights against ordinary conditions and also against dirt and gravel thrown by the wheels. The bolster is made of sufficient depth centrally to abut the ends of the truss members 45, 46, and these are secured to the bolster as by welding. At its ends the bolster is of substantially the depth of the side rails and the U shaped upper and lower rails come together completing the enclosure of the pocket formed.

The trusses each comprise an upper and lower pair of metal members 45, 46 respectively, preferably of angle iron, which extend continuously throughout the length of the truss. The upper of these members 45 has its horizontal leg upward to underlie the floor beams 26, being preferably upwardly arched adjacent the forward end of the truss to give additional wheel clearance in turning, in an amount substantially equal to the depth of the floor beams 26 so that at such end its upper edge lies substantially level with the top of these beams. The lower member has its horizontal leg downward and at the rear end lies along the underside of the upper member with the vertical legs of the angles, preferably abutting, thence angularly diverges forwardly and downwardly to secure the proper truss depth in the center. Centrally of the truss the lower angle iron 46 parallels the upper angle iron and then arches upward in an ogee or goose-neck portion into substantial parallelism and adjacency with the forward end of the upper member.

The spacing of the center portion of the upper and lower members is obviously made sufficient to give proper truss strength, but in any event it is made sufficient to permit a tire or spare wheel for the vehicle wheels 53 to be slipped flatwise therebetween. At the rear end of the truss an auxiliary plate 47 is cut to extend from horizontal leg to horizontal leg of the angles, this plate being secured as by welding rigidly to the two angle iron members to integrate them. At the forward end of the truss a similar plate 48 is similarly placed and secured, and at intermediate points gusset plates 49 and 50 are interposed between the upper and lower angles to form rigid struts or posts.

In this construction, depending on the length of frame and of the truss, the various gusset plates 48, 49 are spaced apart along the truss, not only to give efficient truss posts or struts, but to leave one or more openings 51, 52, each of sufficient length to take a said spare wheel or tire.

In Figs. 2 and 3 openings 51 and 52 are shown for two spare tires. In Figs. 5 an opening 51—A is shown for one tire only, there being insufficient space for more.

At the gusset plates 49, 50, and at the rear end of the gusset plate 48, the two trusses 21 are braced by cross members 55, these shown as channels, being centrally lightened if so desired by openings 56 (Figs. 9 and 10), but extending solidly from truss to truss and being rigidly secured thereto as by welding. At each of the openings 51 the bottoms of the two trusses are braced apart additionally by an X shaped bracing, preferably of channel iron 57, 58, one of these irons extending diagonally from one truss to the other and the other being cut in two and abutting the opposite sides of the through channel, so that their tops may be flush, and being secured thereto by welding. Preferably the upper surface of the channels 57 and 58 is flush with the top of the lower truss angle in order that the spare tire or wheel may be easily slid into or out of the pocket thus formed. Centrally the channels may be provided with a hole 59 through which a bolt may be placed to bolt down the spare tire, but such device being obvious is not here shown. Obviously the channel irons 57 and 58 may be replaced by other structural bracing members or even by a solid plate so long as the purpose is maintained of forming a floor for the spare wheel pockets.

It will be noted that the portion of the lower beam member 46 which extends upwardly and rearward from the central portion is so converged as to lie adjacent the front end of the spring 60 in order that such end of the spring may be directly connected through a bracket 61 to the truss giving an exceptionally efficient and solid connection.

The floor may be of sheet metal and integrally joined, but a heavier floor as of wood is shown, though attaching bolts are not indicated.

Usually a light side bar 62 is secured along the outer faces of the pockets 36, this bar giving additional protection for the pockets, and serving as a rail to which attachment of ropes, such as are used to tie down tarpaulins, thrown over the top of loads carried on the bodies, may be made.

Where a metal floor is used the top member 45 of the trusses is usually made straight throughout rather than arched downward at the front. In such cases the effective depth of the truss is increased except at the forward end.

The preceding description has largely referred to trusses built up from structural shapes. In Figs. 13 to 18 a flanged plate structure is shown, 21—B indicating a truss-like member comprising essentially a channel having a web 65, with integral top and bottom flanges 66, 67 respectively. This channel is centrally deepened and has openings 51—B, 52—B for spare tires in the deepened portion; the forward end portion being shallower to provide wheel clearance in turning. Preferably the top of the member is straight throughout its length, and transverse floor beam portions 68, 68—A; 69—B and 68—C extend from web to web, and are welded thereto. Additional floor beam portions 69, 69—A; 70, 70—A are alined with the beams 68, etc., and extend from web to side rails 20—B and are welded to both thereof. 71 is a channel member disposed longitudinally centrally between the members 21—B, the channel web being upward and substantially level with the bottom of the openings 51—B, 52—B. 72 are transverse members extending from channel to truss-like members and secured thereto by welding, forming floors for the tire pockets.

The channel 71 also forms a support for a guide 73 in which a head 74 is transversably mounted, the head forming part of means for moving and bracing a retractable support 75. Holes 76 may be cut in the web 65, largely for appearance, if desired. 77 indicates a metal floor and 78 a wood floor.

The truss-like member 21—B may be a single plate cut to conform to the desired depths and flanged along its edges, but it may be made up of end and center sections integrally united by welding. The center section in such case comprises an upper channel 80, a lower channel 81, both having wide flanges and a plate 82 disposed therebetween and integrally welded to the lower and upper channel edges respectively, as shown in Fig. 16, this plate having arcuately curved edge portions forming the adjacent ends of the pocket openings 51—B, 52—B.. The lower flanges of the end portions of the lower channel 81 may be upwardly converged, as shown in Fig. 15, if desired, this being done by cutting out gores from the web, and conforming and welding the flanges along the edges of the remaining web portions.

The plate for the rear end portions 65—A of the member 21—B is cut of shape to conform with the web 65 and the upper and lower flanges thereof and of length to extend to and form the rear end of the pocket opening 52—B, the forward end of the plate being arcuately curved to conform to such opening. The plate is cut away to abut the rear ends and lie along the under side of the upper side of the lower channels 80, 81 respectively. The top and bottom flanges 66, 67 are bent or otherwise formed, the broken line bottom flange 67 being formed in two operations and welded at the break 67—A.

The forward portion 65—B is similarly cut out and flanged, except that the plate is ordinarily cut away along the line of the curved lower flange portion 67—B and a strip of flange width is bent into conformity and welded on to form such flange.

In this structure the upper flanges of the end portions and of the channel 80 and the lower flanges of such end portions and of the channel 81 are of substantially equal width and are respectively united by welding into continuous integral members.

Trusses are obviously of various lengths. Should a truss, as in Fig. 5, be too short for two pockets or a longer truss have sufficient space in addition to its pockets, the space between two beams 68—A may be provided with a bottom 85, making with the beams 68—A and the floor 77 a closed space. A door opening, or openings, may be cut through one, or both, truss webs and a suitably hinged door 86, or doors, may be provided therefor.

It will be understood that the entire peripheral edges of both tire pocket openings, including the ends, may be flanged, though such flanging is not shown for the curved ends, and that such flanging would be definitely advisable should the entire truss be formed from a single plate.

I claim:

1. A vehicle frame including a pair of longitudinally disposed trusses and a pair of side rails, spaced apart at intervals; said trusses having upper and lower members, spaced apart along the mid portions of their length in an amount sufficient to permit flatwise housing of a spare wheel or tire for said vehicle therebetween, strut members structurally connecting said mid portions of said upper and lower members, said strut members being spaced apart longitudinally of said frame an amount greater than the diameter of said wheels, means interconnecting and transversely bracing said trusses at said strut members, and means, lying between said interconnecting bracing means, forming a floor between, the bottom members of said trusses in alinement with the opening between said strut members.

2. A vehicle frame in accordance with claim 1 in which the lower edge of said side rails are substantially level with the lower portions of the upper members of said trusses, whereby to permit free access to said housing openings.

3. A vehicle frame including a pair of longitudinally disposed trusses and a pair of side rails, spaced apart at intervals, frame members connecting said rails and the upper members of said trusses, said trusses having upper and lower members spaced apart along their mid portions in an amount sufficient to permit flatwise housing of a spare tire for said vehicle therebetween, strut members connecting said upper and lower truss members, said strut members being spaced apart an amount greater than the diameter of said wheels, and means bracing and forming a floor between the bottom members of said trusses in alinement with the opening between said struts.

4. In a vehicle frame a side rail having a vertically disposed and stepped web, flanges extending inwardly from the upper and lower edges of said web respectively, said upper flange having an L-shaped edge portion extending downwardly and continuing inwardly to form a shelf, the lower portion of said web being outwardly off-set from the upper portion thereof, said upper and lower portions being connected by a substantially horizontal portion forming a shelf.

5. In a vehicle frame a side rail having a vertically disposed and stepped web, flanges extending inwardly from the upper and lower edges of said web respectively, said upper flange having a downwardly extended edge portion, the lower portion of said web being outwardly off-set from the upper portion thereof, said upper and lower portions being connected by a substantially horizontal portion forming a shelf.

6. A vehicle frame including a pair of longitudinally disposed trusses spaced laterally apart; said trusses each having upper and lower members, spaced apart along the mid portions of their length in an amount sufficient to permit flatwise housing of a spare wheel or tire for said vehicle therebetween, strut members structurally connecting said spaced portions of said upper and lower members, said strut members being spaced apart longitudinally of said frame an amount greater than the diameter of said wheels; means interconnecting and transversely bracing said trusses at said strut members, and means, lying between said interconnecting bracing means, forming a floor between, the lower members of said trusses in alinement with the opening between said strut members.

7. A vehicle frame including a pair of longitudinally disposed trusses spaced laterally apart, said trusses each having upper and lower members spaced apart along their mid portions in an amount sufficient to permit flatwise housing of a spare tire for said vehicle therebetween, strut members connecting said upper and lower truss members, said strut members being spaced apart an amount greater than the diameter of said wheels, and means bracing and forming a floor between the bottom members of said trusses in alinement with the openings between said struts.

8. In a vehicle having wheels, a frame including a pair of laterally spaced truss-like members each comprising an elongated channel shaped member having flanged top and bottom edge portions extending throughout its length and interconnecting web portions, said channel member having central portions of substantially uniform depth in excess of wheel thickness, for a length in excess of a plurality of wheel diameters, and end portions of substantially shallower depth, said central portions each having between web portions thereof, openings each of length and depth to permit passage of a horizontally disposed said vehicle wheel; and bracing means including vertically disposed bracing members secured to and extending between said channel members adjacent the ends of said openings, and horizontally disposed bracing members forming a floor between bottom edge portions of said channel members in alinement with said openings.

9. In a vehicle having wheels, a frame including a laterally spaced pair of truss-like members each comprising an elongated channel shaped member having flanged top and bottom edge portions extending throughout its length and interconnecting web portions, said channel members having central portions of substantially uniform depth in excess of wheel thickness, and of length at least in excess of one wheel diameter, and end portions of substantially shallower depth, said central portions each having between web portions thereof, at least one opening of length and depth to permit passage of a horizontally disposed said vehicle wheel; and bracing means including vertically disposed bracing members secured to and extending between said channel member adjacent the ends of said openings, and means bracing and forming a floor between said bottom edge portions in alinement with said openings.

JAMES MADISON FOSTER.